United States Patent [19]

Adachi

[11] Patent Number: 4,846,944
[45] Date of Patent: Jul. 11, 1989

[54] PROCESS FOR FIGURING THE SURFACE OF A METAL MIRROR

[75] Inventor: Iwao P. Adachi, Westminster, Calif.

[73] Assignee: The United States of America as represented by the Secretary of the Army, Washington, D.C.

[21] Appl. No.: 255,804

[22] Filed: Oct. 11, 1988

[51] Int. Cl.[4] .............................................. C25F 3/16
[52] U.S. Cl. .............................. 204/129.2; 204/129.6; 204/129.7; 204/129.75; 204/129.8; 204/129.95
[58] Field of Search ............... 204/129.2, 129.7, 129.8, 204/129.85, 129.9, 129.95, 129.6

[56] References Cited

U.S. PATENT DOCUMENTS

| | | | |
|---|---|---|---|
| 2,588,734 | 3/1952 | Kolodney | 204/129.9 X |
| 2,594,124 | 4/1952 | Charlesworth | 204/129.9 X |
| 3,810,829 | 5/1974 | Fletcher et al. | 204/129.7 X |
| 4,456,516 | 6/1984 | Schaffner | 204/129.25 X |
| 4,541,909 | 9/1985 | Fromson | 204/129.2 |

Primary Examiner—Donald R. Valentine
Attorney, Agent, or Firm—Robert L. Broad, Jr.; Freddie M. Bush; James T. Deaton

[57] ABSTRACT

A process for figuring the surface of a beryllium mirror to a predetermined curvature wherein the configuration of the mirror surface is sensed to locate areas of the mirror surfaces which are higher than desired and then a stream of phosphoric acid diluted with water and ethylene glycol is directed into contact with the areas of the mirror which are higher than desired while at the same time a current of 10 to 200 milliamps is passed through the stream to the mirror to electro-chemically polish the mirror surface.

8 Claims, 1 Drawing Sheet

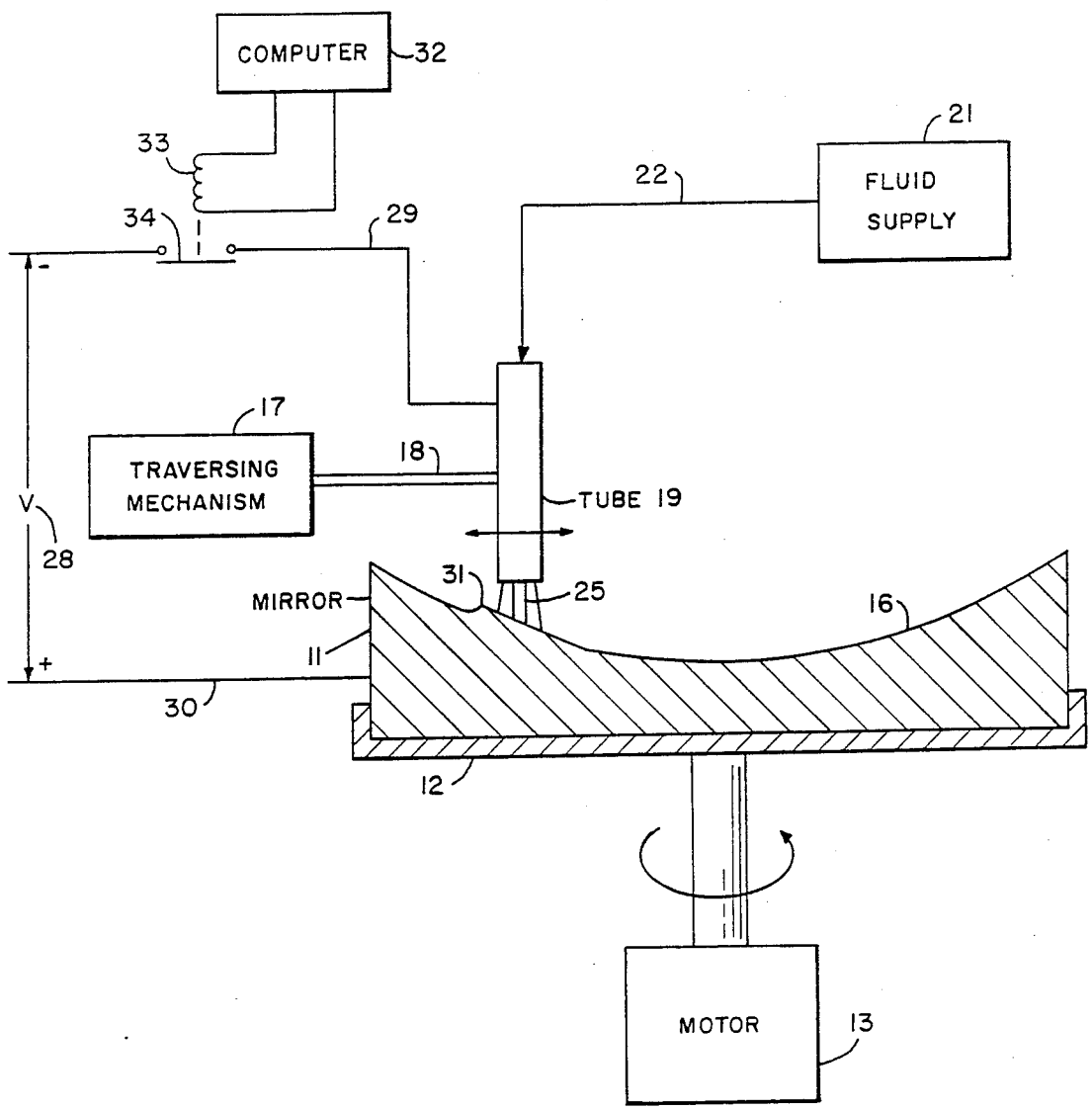

4,846,944

PROCESS FOR FIGURING THE SURFACE OF A METAL MIRROR

DEDICATORY CLAUSE

The invention described herein may be manufactured, used, and licensed by or for the Government for governmental purposes without the payment to me of any royalties thereon.

BACKGROUND OF THE INVENTION

1. Field of the Invention

This invention relates to processes for figuring the surfaces of metallic mirrors.

2. Prior Art

Glass mirrors are easy to polish to a desired surface configuration by the use of a conventional pitch tool and jeweler's rouge, for the reason that glass is homogeneous. However, for space applications, mirrors made of glass are not as acceptable as those made from a metal such as beryllium. Unfortunately, it is very difficult to polish a mirror made from beryllium and certain other metals to obtain the desired mirror surface, for the reason that these metals are not homogeneous. For example, if an attempt is made to polish a beryllium surface by conventional procedures, the surface will not polish uniformly but will have various types of defects. Generally, the nature of the defects will be such that the mirror surface will have areas which are higher than desired. Such a surface will form a distorted image.

SUMMARY OF THE INVENTION

A process for figuring the surface of a beryllium mirror to a predetermined curvature wherein the configuration of the surface of the mirror is sensed to locate areas of the mirror which are higher than desired and a stream of diluted phosphoric acid is directed into contact with the higher area of the mirror while a current of 10 to 200 milliamps is passed through the phosphoric acid to the mirror to electrochemically polish the mirror surface.

DESCRIPTION OF THE DRAWING

The single figure of the drawing is a cross-sectional schematic view showing the positioning of apparatus used in carrying out the process of this invention.

DETAILED DESCRIPTION OF THE INVENTION

Referring now in detail to the drawing, there is shown a circular mirror 11 positioned on a turntable 12 driven by a motor 13. The mirror 11 has a surface 16 which is to be polished or figured to a desired curvature so that the mirror can be used as part of a telescope. The motor 13 is set up to drive the turntable 12 and the mirror 11 at a very slow rate, for example about 6 to 20 revolutions per minute. Preferably, the mirror is driven at a rate of about 10 revolutions per minute.

A traversing mechanism of a known type 17 is connected by a linkage 18 to a non-conductive tube 19, the traversing mechanism 17 being set up to slowly traverse the tube 19 back and forth along a radius of the mirror 11. The traversal rate is about 0.5 to 2.0 inches per minute and is preferably about pb 1.0 inch per minute.

A fluid supply 21 connected by a line 22 to the tube 19 provides a supply of fluid to be passed through the tube 19 in a stream 25 onto the surface 16 of the mirror 11. The fluid is phosphoric acid diluted with a mixture of 30 to 60 weight percent water and 70 to 40 weight percent ethylene glycol. The amount of the diluting mixture of water and ethylene glycol is about 97 to 94 weight percent of the total fluid weight, including the phosphoric acid.

A power supply 28 is connected through lines 29 and 30 to force a current from the fluid 25 through the tube 19 to the mirror 11. Current flowing through the stream 25 causes the formation of an extremely thin layer of beryllium oxide on the surface 16 of the mirror 11 where the stream 25 is falling, the action of the stream 25 then washing this thin layer of oxide from the mirror surface to thereby change the configuration of the surface 16. A computer 32 operates a relay 33 having contacts 34 to connect the voltage supply 28 through the tube 19 to the mirror 11.

The power supply 28 is such that the voltage applied to the stream is about 5–20 volts dc, this being sufficient to force a current of 10–200 milliamps through the stream 25 to the mirror 11. The negative side of the power supply 28 is connected to the fluid stream 25. Preferably, the power supply 28 will have an output voltage of 10 to 15 volts, with a current through the stream 25 of about 100 milliamps.

The tube 19 will preferably have a diameter of about ½ inch, with a fluid flow rate through the tube of about 0.5 to 1.5 gallons per minute. A preferred flow rate is about 1 gallon per minute.

Prior to beginning the polishing or figuring operation, the surface 16 is sensed by a laser interferometer for the purpose of locating areas of the surface 16 which are higher than desired i.e., those areas, one of which is identified in the drawing by reference numeral 31, of the mirror where additional material must be removed to bring the surface 16 to the desired configuration or curvature. This is a known procedure.

A laser interferometer is located at the center of curvature or at the focus of the mirror and an interferogram is obtained and then is processed by a computer. The computer calculates the height contour of the mirror and indicates both the location of each high area 31 and the height of the area above the desired curvature of the surface 16. This is a known procedure. This information will enable the computer 32 to operate the relay 33 to properly control the polishing or figuring operation.

In operation, the mirror 11 is rotated at a rate of about 6 to 20 revolutions per minute by the motor 13 as the tube 19 is traversed slowly back and forth along the radius of the mirror by the traversing mechanism 17. Diluted phosphoric acid from the supply 21 is continuously passed through the tube 19 to form the stream 25 inpacting the surface 16 of the mirror 11.

The information stored in the computer 32 causes the computer to control the relay 33 to close its contacts 34 when the tube 19 is above an area, such as area 31, of the surface 16 which is higher than the desired curvature. Closure of the contacts 34 causes an electrical current to flow through the stream 25 to the surface of the mirror 11 to electro-chemically polish that portion of the surface 16 on which the stream 25 is falling, thereby removing a very thin layer of the surface 16 at a removal rate of about 0.03 um/minute.

The computer 32 calculates the amount of the surface removed as the high area passes under the tube 19 and uses this information to control the elctro-polishing as the high area again passes the tube 19. Inasmuch as the computer retains a knowledge of the location and height of each high area 31 it can continue to control the polishing of each high area 31 as the high areas are polished toward the desired curvatue.

I claim:

1. A process for figuring the surface of a metal mirror to a predetermined curvature, comprising:
   a. sensing the configuration of the mirror surface to locate areas of the mirror surface which are higher than desired,
   b. directing a stream of phosphoric acid into contact with said areas of the mirror surface which are higher than desired, said phosphoric acid being diluted with a mixture of 30 to 60 weight percent water and 70 to 40 weight percent ethylene glycol, and
   c. passing a current of 10 to 200 milliamps through the stream to said higher area to electro-chemically polish said area.

2. The process of claim 1 wherein the mirror is rotated and the stream is passed through a tube, said tube being traversed along a radius of the mirror as the mirror is being rotated.

3. The process of claim 2 wherein the current is applied only when the stream is being directed onto said higher areas.

4. The process of claim 3 wherein the flow rate of the fluid is ¼ to 2 gallons per minute.

5. The process of claim 4 wherein the end of the tube is ¼ to 1 inch from the mirror surface and the current is applied to the mirror under a voltage of 5 to 20 volts DC.

6. A process for figuring of a beryllium mirror to a predetermined curvature, comprising;
   a. sensing the configuration of the mirror surface to locate areas of said mirror surface which are higher than desired,
   b. directing a stream of diluted phosphoric acid into contact with said areas of the mirror's surface which are higher than desired, said phosphoric acid being diluted with 97 to 94 weight percent of a mixture of 30 to 60 weight percent water and 70 to 40 weight ethylene glycol, and
   c. passing a current of 10 to 200 milliamps through the steam to said higher area to electrochemically polish said area.

7. The process of claim 6 wherein the current is a direct current of about 25 to 100 milliamps.

8. The process of claim 7 wherein the mirror is simultaneously rotated at a speed of 6 to 20 revolutions per minute and the stream of diluted phosphoric acid is traversed along the radius of the mirror at a rate of 0.5 to 2.0 inches per minute.

* * * * *